E. S. GOMES

July 11, 1933.

Re. 18,892

FIBERBOARD SHIPPING CARTON

Original Filed May 6, 1931 2 Sheets-Sheet 1

INVENTOR.

EARL S. GOMES

BY James N. Ramsey

ATTORNEY.

Jan. 12, 1932.
E. S. GOMES
Re. 18,892
FIBERBOARD SHIPPING CARTON
Original Filed May 6, 1931 2 Sheets-Sheet 2
Fig. 7.
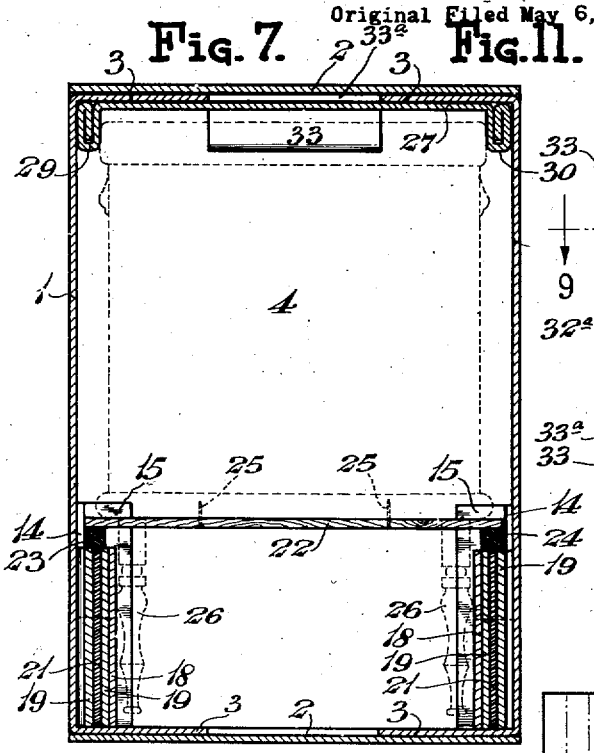
Fig. 11.
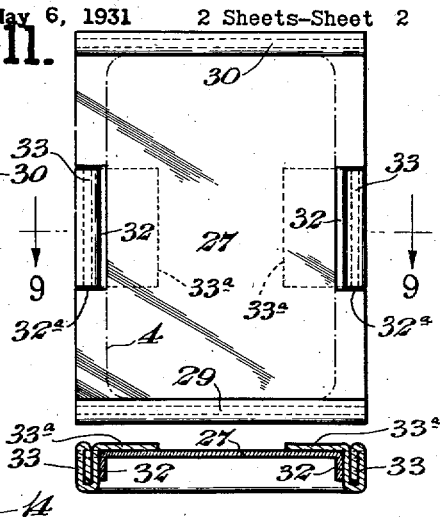
Fig. 9.
Fig. 10.
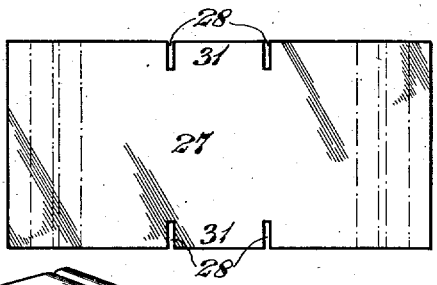
Fig. 8.
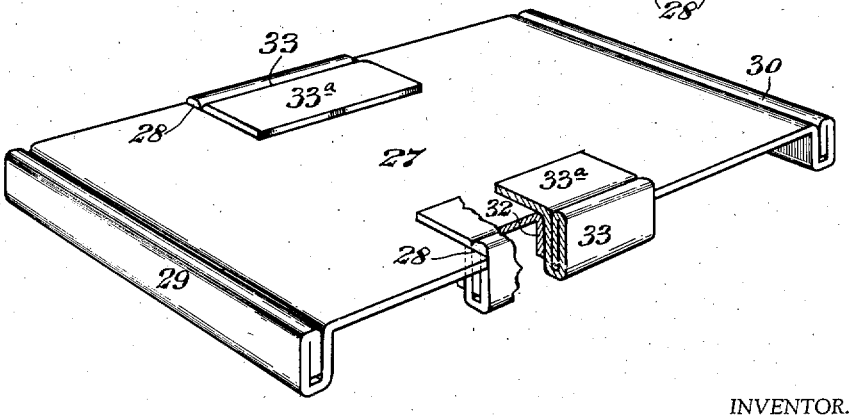
INVENTOR.
EARL S. GOMES
BY James N. Ramsey
ATTORNEY.

Reissued July 11, 1933 Re. 18,892

UNITED STATES PATENT OFFICE

EARL S. GOMES, OF CINCINNATI, OHIO

FIBERBOARD SHIPPING CARTON

Original No. 1,841,025, dated January 12, 1932, Serial No. 535,463, filed May 6, 1931. Application for reissue filed March 13, 1933. Serial No. 661,930.

My invention relates to shipping cartons and more particularly to a fiberboard carton used for shipping radios and the like.

Heretofore various types of inner supports for fiberboard shipping cases have been devised but all of said supports, to the best of my knowledge, are difficult to insert within the carton, do not readily maintain their proper placement and, in the majority of instances, it is necessary to place the article to be shipped within the carton and then insert the inner supports in order to keep them together and at the proper supporting position relative to the article to be shipped.

The object of my invention, generally stated, is to provide improved inner supports for cartons of the class above specified which are simple, efficient, economical to manufacture, easily inserted within and removed from the carton and will maintain their proper placement within the carton both before and after the radio or like article to be shipped is packed therein.

Another object of my invention is to provide inner supports for fiberboard shipping cartons which can be easily assembled by the carton manufacturers ready for use, thus eliminating the usual time required of the packer in assembling said supports.

More specifically stated, my object is to provide a carton which may be quickly set up and which will hold a radio cabinet suspended off of its legs and in such a manner that all parts of the cabinet will be so suspended that no part thereof will come into contact with the carton or outer container.

Another object of the invention is to provide simple and efficient protective means to firmly hold the cabinet in fixed, non-sliding relation to the top plate, thereby preventing the surface of the cabinet from being marred by rubbing.

A still further object of my invention is to provide an improved fiberboard top plate which is of a size suitable for snugly fitting within the top of the carton.

My invention consists in the construction, combination, location and arrangement of parts, all as herein set forth and claimed.

In the drawings:

Fig. 7 is a vertical section through a fiberboard shipping carton showing my improved inner supports and top plate for spacing an article to be shipped from the side walls and top and bottom of the carton;

Fig. 8 is a perspective view, partly in section, of the top plate, one of the side pads being partly shown in section to clearly illustrate its assemblage with the plate;

Fig. 9 is a cross section of the top plate and side pads taken on a plane corresponding to line 9—9 of Fig. 11;

Fig. 10 is a plan view of the blank of the top plate before bending; and

Fig. 11 is a bottom view of the top plate and side pads and showing the outline of the radio by broken lines.

The structure hereinafter described is particularly adapted to be used as a shipping container for console type radio cabinets with radio receiver and speaker installed, or any other like cabinet or piece of furniture.

In the embodiment of my invention as illustrated and which shows a preferred construction I provide a shipping carton 1, which is preferably but not necessarily composed of double-wall fiberboard and is provided with side flaps 2—2 and end flaps 3—3 at the top and bottom to close the top and bottom of said carton in a manner well known.

Referring now in detail to one of the inner supports for the carton 1, I have shown a radio cabinet as the article to be shipped which is designated 4 and shown by dotted outline in Fig. 7, but it is to be understood that various other articles, such as furniture, can be shipped, the inner supports not being limited to supporting radio cabinets but being adapted to support any article of a similar nature.

Figure 1:
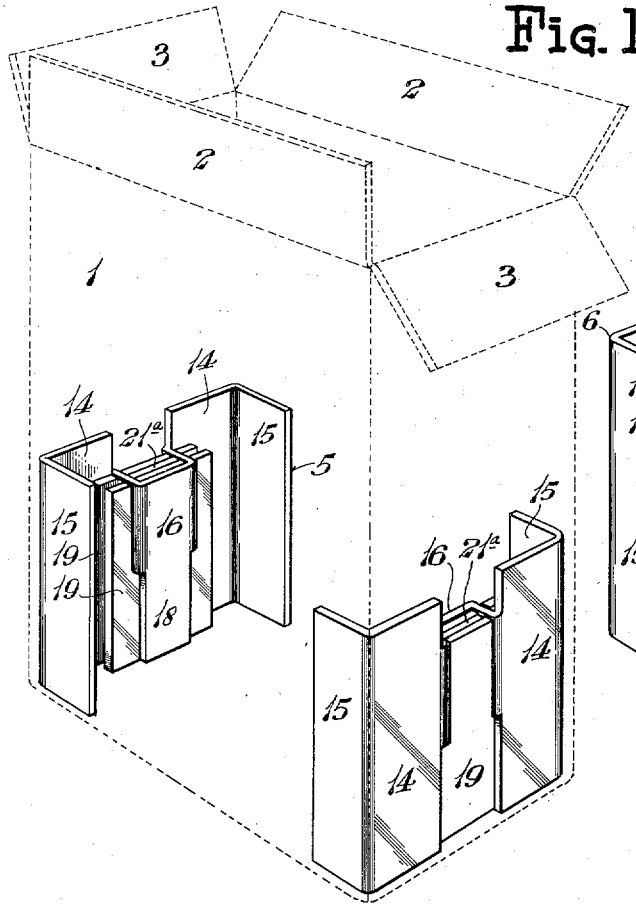
Fig. 1 is a perspective phantom view of a fiberboard shipping carton showing, by full lines, my improved inner supports and the relative position they assume within the bottom portion of the carton.
Figure 2:
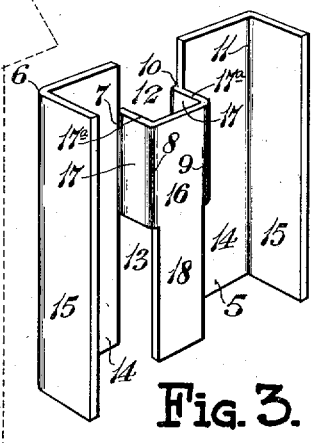
Fig. 2 is a perspective view of the main or body part of one of the supports.
Figure 3:
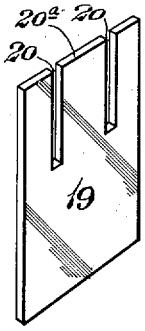
Fig. 3 is a perspective detail of one of the flat panels.
Figure 4:
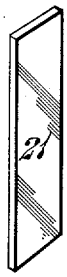
Fig. 4 is a perspective detail of one of the wedge supporting and strengthening strips.
Figure 6:
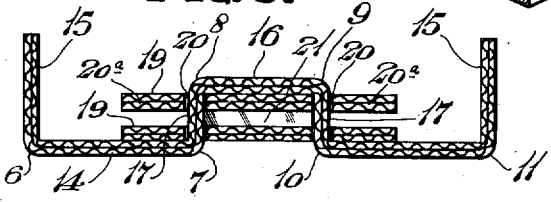
Fig. 6 is a top view of one of the supports shown in Fig. 1.

As shown in detail in Fig. 2, 5 designates the body of one of the inner supports which is preferably formed from a blank of corrugated fiberboard scored and died out so that when said blank is folded it will appear as shown in Fig. 2. This body 5, being scored on the lines 6, 7, 8, 9, 10 and 11, respectively, and died out at 12 and 13, when bent, forms aligned end walls 14—14 and relatively short oppositely disposed side walls or flanges 15—15. The accessory end walls 14—14 are integrally joined together by the U-shaped inset portion 16, which portion is provided with downwardly depending support 18, said parts 14, 15, 16, 17 and 18 forming flanged, upright, retaining, spacing and supporting members. 19 represents one of the flat panels, a detail of which is shown in Fig. 3, and numerals 20—20 designate slots in said panel which are of a width suitable for receiving the side walls 17 of the U-shaped inset portion 16, as will presently be described. Wedge strengthening strip 21, shown in Fig. 4, is of a width suitable for being received between the side walls 17 of the U-shaped inset portion 16, as shown in Fig. 6. After the body 5 has been scored and died out, as described, and bent on the scored lines to the position shown in Fig. 2, two of the flat panels 19 are placed between the downwardly depending support 18 and the end walls 14—14 and pushed inwardly so that the slots 20—20 of said panels receive the side walls 17—17 of the inset portion 16, the depth of the slots being equal to the depth of the side walls 17. The panels are then pushed upon the side walls 17 and the top edges 20*a* are brought into alignment or flush with the top edges 17*a* of the side walls 17, as shown in Figs. 1, 2 and 6. One of the wedge strengthening strips 21 is then inserted between panels 19 and between the walls 17—17 of the inset portion 16, as shown in Fig. 6, thus wedging panels 19 tightly against the body 5 or sufficiently so to hold them rigid relative to one another.

Figure 5:
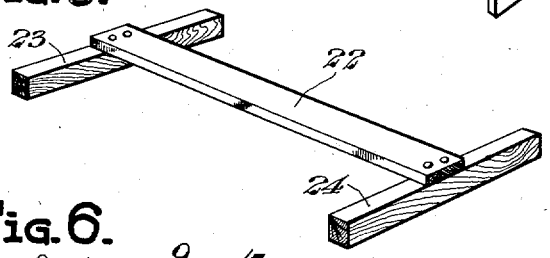
Fig. 5 is a perspective view of the wooden brace usually employed in shipping radios.

In the present showing I have illustrated a radio cabinet 4 as the article to be shipped and in this showing it is customary to provide a wooden support such as shown in Fig. 5. This wooden support comprises cross member 22 and end members 23 and 24, which end members are preferably nailed to the cross member 22 as shown. The cross member 22 is then secured to the bottom of the radio cabinet 4 in any suitable manner as, for example, by nails 25, as shown in Fig. 7 and with the wooden support thus attached to the cabinet 4, said cabinet can be placed within the carton 1, the end members 23 and 24 being supported upon the top edges 20*a* of the flat panels 19 and the top edge 17*a* of the side walls 17 and upon the top edge 21*a* of the wedge strengthening strip 21, as shown in Fig. 7. The entire weight of the cabinet 4 is thereby carried by the inner supports as the legs 26 are spaced from the bottom of the carton 1, thereby preventing the legs from being broken and also preventing holes being punched in the carton by the legs.

Referring now to the top plate of the carton and to Fig. 10, 27 designates a blank which is notched or cut away at 28 and scored, as shown by the dotted lines. The ends of the blank 27 are then bent upon the scored lines so as to assume the position shown in Figs. 8 and 11, thus providing relatively thick flanged ends 29 and 30. The portions 31 between the notches 28 are then bent downwardly to form flaps 32 and spaces or openings 32*a*, as clearly shown in Figs. 8 and 9 and pads 33, bent to the form clearly shown in Fig. 8, are mounted upon the top plate and partly project into the openings 32*a*, as shown. With these pads 33, in connection with the top plate, the upper part of the cabinet 4 is spaced from the side and end walls of the carton 1, as clearly shown in Figs. 7 and 11. The radio cabinet is mounted between side flaps 32 which are re-inforced by side pads 33 and between flanged ends 29 and 30, so that there can be no movement either longitudinally or laterally of the cabinet relative to the top plate 27, thereby preventing the cabinet from frictional or rubbing engagement therewith and thus preventing marring of the surface of the cabinet. The width of the side pads 33 is of such dimension as to snugly fit in the openings 32*a* whereby said pads are locked against movement within the carton, as clearly shown in Figs. 8 and 11.

I have found that by forming the inner supports as above described they are not only stronger than supports heretofore used for the purposes specified but, due to their peculiar construction, remain in their intended position within the carton before or after inserting the article to be shipped. They are constructed in such a way that they will stand in a vertical position parallel with the wall of the carton and there is nothing in their construction that will cause them to expand and force themselves out of parallel alinement with the wall of the carton.

In a previous application filed by me in the Patent Office I show an inner support for fiberboard cartons but due to the construction there shown the support does not maintain its proper placement within the carton unless held in place until the article to be shipped is inserted within the carton, which results in considerable loss of time in packing and which requires to be assembled and reassembled by the shipper, as its construction will not hold it together, as is the case with the present inner support. The support of the present invention is self-contained, that is, it can be assembled by the box manufacturer and shipped to the packer ready for installation within a carton. Further, due to its construction, after being placed within a carton, it will retain its proper placement in a highly satisfactory manner.

An advantage of my invention is that the interlocking and supporting members have no tongues or extensions that will interfere with their easy insertion within the carton. Without a tongue or extension at the point where the fiber support comes into contact with the wooden brace an easy means is afforded to catch hold of the support to remove the complete self-contained interlocking unit from the carton.

Radio cabinets and other articles frequently have portions which project beyond the main body of the article, such as knobs or enlarged portions on legs or the main body may have outwardly projecting portions. One of the advantages of my invention is that the top or cover plate can be readily varied in length by making greater or less number of folds, as may be necessary in the flanged ends 29 and can be varied in width by making a greater or less number of folds in the pads 33.

Some of the advantages of my invention over prior constructions are that the supporting unit, formed of interlocking members, maintains all pieces in upright or vertical position at all times and allows all supporting members to stand flat against the end of the shipping carton without forcing it away in any manner from either end thereof; also the arrangement of the slots affords a ready and convenient means of interlocking the upright flanged retaining, spacing and supporting members with the supporting panels 19 in such a way that these parts can be readily and conveniently assembled together by the manufacturer, ready for insertion in the carton by the user and also eliminates the necessity and inconvenience of assembling these parts in the carton. The parts can be cut and scored and stacked flat ready for storage or shipment and can be easily and speedily assembled into self-contained units before being put into the containers. Furthermore, it is adapted to hold the cabinet in fixed position within the container and permits the detachable mounting of the cabinet thereon so that when the container is opened, the cabinet can be removed without the withdrawal of any nails or other fastening means.

While I have shown and described one particular embodiment of my invention, it will be understood that various changes and modifications can be made without departing from the scope or spirit thereof as, for example, for light packing the wedge strengthening support 21 can be entirely dispensed with. In practice I have used single wall corrugated fiberboard to make the body 5 of the inner support and double-wall corrugated fiberboard for use in making the flat panels 19 and a relatively stiff solid piece of fiberboard for the wedge strips 21, it being understood, of course, that other thicknesses or weights of fiberboard or other suitable material can be used, depending entirely upon the weight of the article to be shipped within the carton 1.

Having thus described my invention, what I claim as new and desire to secure by Letters Patent is:

1. In a shipping carton, a pair of units each comprising an upright flanged and slotted retaining, spacing and supporting member detachably interlocked with a flat slotted panel, said units being adapted for detachable mounting in the respective ends of a carton, for the purposes specified.

2. In a shipping carton, a pair of units each comprising an upright flanged retaining, spacing and supporting member detachably connected with a supporting panel, said units being adapted to be removably mounted within the respective ends of a carton, for the purposes specified.

3. A shipping carton comprising a container having detachably mounted therein an upright flanged and slotted retaining, spacing and supporting member having its central portion inset, in combination with a slotted interlocking panel.

4. A shipping carton comprising an outer fiberboard body with means to close the top and bottom thereof, a pair of inner supporting members, each of which comprises a main blank scored in a plurality of places and provided with spaced apart slots to form an inset, a plurality of flat panels adapted to interlock with said inset and a wedge strengthening strip inserted between said panels and inset, substantially as described and for the purposes specified.

5. A shipping carton comprising an outer fiberboard body with means to close the top and bottom thereof, a pair of inner supporting members each comprising a blank of fiberboard creased to provide end walls with integrally formed relatively short side walls, an inset central portion integrally formed with said end walls and a plurality of flat panels adapted to interlock with said inset portion.

6. In combination with a shipping carton, inner supporting members therefor comprising a main body member scored and died out to supply, when bent, side walls, end walls and a U-shaped inset member integrally formed with said side walls, a depending support integrally attached to said U-shaped inset member, the side walls of said U-shaped member being disposed in a plane parallel to said side walls of said body member and a plurality of slotted panels, the slots of which are adapted to receive the side walls of said U-shaped inset member to thereby frictionally hold said panels and body in detachably interlocked relation relative to one another.

7. In combination with a shipping carton, a top insert plate therefor comprising a blank scored at opposite ends and slotted between the scored lines to provide inwardly projecting tabs, side pads adapted to be received adjacent said tabs, and end pads formed at opposite ends of said plate by bending the plate upon itself at the scored lines, substantially as set forth and for the purposes specified.

8. A shipping carton comprising a container having detachably mounted within each end thereof an upright flanged and slotted retaining, spacing and supporting member having its central portion inset, in combination with a plurality of slotted double-walled corrugated fiberboard detachably interlocking panels with solid fiberboard strengthening wedges interposed between said panels, substantially as set forth and for the purposes specified.

9. In a shipping carton of the class described a pair of self-contained units, each unit composed of an upright member adapted to lie against the inner surface of the carton wall, a substantially solid member attached to said upright member to form a self-contained unit, the upper edge of said solid member being so positioned as to form a supporting ledge.

10. In a shipping carton of the class described, a pair of self-contained units, each unit composed of an upright member adapted to lie against the inner surface of the carton wall, a substantially solid member attached to said upright member to form a self-contained unit, the upper edge of said solid member being so positioned as to form a supporting ledge, a supporting brace mounted upon said ledges and a top insert plate whereby the contained article is adapted to be held in spaced-apart relation with the carton by said self-contained units, supporting brace and top plate respectively, said self-contained units, supporting brace and top plate being mounted within the carton, for the purposes specified.

EARL S. GOMES.